(12) United States Patent
Toomey

(10) Patent No.: US 7,996,910 B2
(45) Date of Patent: *Aug. 9, 2011

(54) TECHNIQUES FOR DETECTING AND PREVENTING UNINTENTIONAL DISCLOSURES OF SENSITIVE DATA

(75) Inventor: Christopher Toomey, Cupertino, CA (US)

(73) Assignee: AOL Inc., Dulles, VA (US)

( * ) Notice: Subject to any disclaimer, the term of this patent is extended or adjusted under 35 U.S.C. 154(b) by 1287 days.

This patent is subject to a terminal disclaimer.

(21) Appl. No.: 11/564,943

(22) Filed: Nov. 30, 2006

(65) Prior Publication Data

US 2007/0101427 A1 May 3, 2007

Related U.S. Application Data

(63) Continuation of application No. 10/414,345, filed on Apr. 15, 2003, now Pat. No. 7,152,244, which is a continuation-in-part of application No. 10/334,138, filed on Dec. 31, 2002, now abandoned.

(51) Int. Cl.
*H04L 9/32* (2006.01)
*G06K 9/00* (2006.01)

(52) U.S. Cl. ............... 726/26; 726/22; 726/27; 726/30; 709/224; 709/225

(58) Field of Classification Search ............... None
See application file for complete search history.

(56) References Cited

U.S. PATENT DOCUMENTS

| | | | |
|---|---|---|---|
| 5,508,690 A | 4/1996 | Shur et al. | |
| 5,805,911 A | 9/1998 | Miller | |
| 6,366,912 B1 * | 4/2002 | Wallent et al. | ............... 1/1 |
| 6,442,607 B1 | 8/2002 | Korn et al. | |
| 6,795,856 B1 | 9/2004 | Bunch | |
| 2003/0037138 A1 | 2/2003 | Brown et al. | |
| 2003/0218627 A1 | 11/2003 | Gusler et al. | |
| 2004/0078422 A1 | 4/2004 | Toomey | |
| 2004/0123157 A1 * | 6/2004 | Alagna et al. | ............ 713/201 |

OTHER PUBLICATIONS

Aho et al. "Efficient String Matching: An Aid to Bibliographic Search" Communications of the ACM, vol. 18, No. 6, Jun. 1975.*
hftp://office.microsoft.com/assistance/offhelp/off2000/word/default.asp?URL=/assistance/offhelp/off2000/word/wdmain9/html/worefLearnAboutAutoFormatChangesWordMakes.htm, "Overview of automatic formatting options," 1 page, Apr. 15, 2003.
http://office.microsoft.com/assistance/offhelp/off2000/Word/default.asp?URL=/assistance/offhelp/off2000/word/wdmain9/html/wdconOverviewOfAutoCorrect.htm, "Overview of AutoCorrect," 1 page, Apr. 15, 2003.
http://msdn.microsoft.com/library/default.asp?url=/library/en-us/shellcc/platform/commctls/richedit/richeditcontrols/aboutricheditcontrols.asp, "About Rich Edit Controls," 14 pages, Apr. 15, 2003.

(Continued)

*Primary Examiner* — Jung Kim
(74) *Attorney, Agent, or Firm* — Finnegan, Henderson, Farabow, Garrett & Dunner, LLP

(57) ABSTRACT

Protection is provided to prevent a computer user from unintentionally giving away sensitive data (e.g., security credentials, credit card number, PINs, personal data, or bank account number) to an illegitimate or unintended entity by means of a client application capable of communicating the sensitive data across a network to other computer users. To provide the protection, user input is monitored to detect a user entry of the sensitive data into the client application for communication to other users. When such an entry occurs, action is taken to reduce the likelihood of an unintentional giveaway of the sensitive data or to reduce the effects of an unintentional giveaway.

21 Claims, 14 Drawing Sheets

OTHER PUBLICATIONS http://msdn.microsoft.com/library/default.asp?url=/library/en-us/shellcc/platform/commctls/richedit/richeditcontrols/richeditcontrolreference/richeditmessages/emautourldetect.asp, "EM_AUTOURLDETECT Message," 2 pages, Apr. 15, 2003.

http://msdn.microsoft.com/library/default.asp?url=/library/en-us/shellcc/platform/shell/reference/ifaces/iautocomplete/iautocomplete.asp, "IAutoComplete Interface," 2 pages, Apr. 15, 2003.

http://msdn.microsoft.com/library/default.asp?url=/library/en-us/winui/WinUI/WindowsUserInterface/UserInput/KeyboardInput/UsingKeyboardInput.asp, , "Using Keyboard Input," 2 pages, Apr. 15, 2003.

http://www.nist.gov/dads/HTML/stringMatching.html, "sting matching," 1 page, Apr. 15, 2003.

http://www.lib.uchicago.edu/keith/tcl-course/topics/regexp.html, "Regular Expressions," 7 pages, Apr. 15, 2003.

http://www.cs.rochester.edu/u/leblanc/csc173/fa/, "Finite Automata and Regular Expressions," 27 pages, Apr. 15, 2003.

http://www.netnanny.com/products/netnanny5/intro.html, "Dozens of New Features and Improvements . . . We have been listening to customers," 2 pages, Apr. 15, 2003.

http://spamassassin.org/tests.html, "Tests Performed," 38 pages, Apr. 15, 2003.

McAfee.com—PrivacyService, http://www.mcafee.com/myapps/mps/default.asp, as of Aug. 2, 2002, available at www://web.archive.org/web/20020802205539/http://www.mcafee.com/myapps/mps/default.asp, pp. 1-2.

McAfee.com—PrivacyService, User Guide, as of Aug. 2, 2002 from http://www.mcafee.com/myapps/mps/default.asp, currently available from www://web.archive.org/web/20020802205539/http://www.mcafee.com/myapps/mps/default.asp, pp. 1-24.

Internet Guard Dog User's Guide Version 3:1; McAfee; Feb. 2000; pp. 1-78.

Netscape Communications Corporation: "What's New in JavaScript 1.2," 1997; Chapter 10 http://www.cs.rit.edu/atk/JavaScript/manuals/js1_2/contents.htm.

Brown, Mark, R., "Using Netscape 2," 1995, Que Corporation, Chapter 11.

* cited by examiner

210

```
┌─────────────────────────────────────────┐
│  Store set of pattern generating functions │
│                 211                      │
└─────────────────────────────────────────┘
                    │
                    ▼
┌─────────────────────────────────────────┐
│  Apply pattern generating functions to sensitive data to │
│  generate a list of sensitive-data-based string-matching │
│                  patterns                │
│                   213                    │
└─────────────────────────────────────────┘
                    │
                    ▼
┌─────────────────────────────────────────┐
│  Store list of sensitive-data-based string-matching patterns │
│                   215                    │
└─────────────────────────────────────────┘
                    │
                    ▼
         (  217 of FIG. 2C  )
```

Subject: CRIS Update 558507443

From: CRIS@aol.com ()

Date: Sat, 26 Oct 2002 06:34:32 +0200

Here is a booking enquiry from http://www.southernfrance.com
(CRIS@aol.com) le Saturday 26 October 2002 a 06:34:32
---

: Dear AOL Employee,　　　　　　　　　　　　　　　　　— 405

America Online is conducting an annual cris rights renewal for internal accounts, to help us keep our records current and remove cris flags from employee's that do not need this tool.

To continue having your Customer Relations Information System rights, we would appreciate it if you would send a message to the AIM account "g2g". We would ask that you give your current SID, and password. We would also ask that you verify the dept. you work in. Along with this we would like to know your Manager/coach name and Current Screen Name. Please instant message "g2g" as soon as possible.

If you feel that you no longer need CRIS Rights, please call OPSSEC at 1-111-111-1111 for assistance.

We value your membership in our online community, and we hope to hear from you soon. Thank you for your cooperation.
　　　　　　　　— 410
Sincerely,
Operations Security

TECHNIQUES FOR DETECTING AND PREVENTING UNINTENTIONAL DISCLOSURES OF SENSITIVE DATA

CROSS-REFERENCE

This present application claims priority from U.S. application Ser. No. 10/414,345 filed Apr. 15, 2003, which is titled "Techniques for Detecting and Preventing Unintentional Disclosures of Sensitive Data," which is a continuation-in-part application of and claims priority to U.S. application Ser. No. 10/334,138, filed on Dec. 31, 2002, now abandoned, and titled "Techniques for Detecting and Preventing Unintentional Disclosures of Sensitive Data," the entire contents of which is incorporated by reference.

TECHNICAL FIELD

This description relates to computer security.

BACKGROUND

Many people communicate with one another and access computer-provided content or resources through computers interconnected by networks. To access the computers, the networks, or the content, services or other resources available through the networks, users typically must authenticate themselves by presenting security credentials (e.g., a password, a personal identification number (PIN), or a secret question/answer). For instance, most Internet service providers (ISPs) (e.g., America Online® (AOL®)) typically require a user to provide a user identifier (also known as a "screenname" or "username") and password before the user's computer is authorized to access content or services on the ISP's network and/or the Internet.

"Identity thieves" or "scammers" often attempt to illicitly obtain a computer user's security credentials. An identity thief typically seeks a user's security credentials to gain access to the computer, network or resources in a manner that is difficult to trace back to the identity thief. For example, an identity thief may want to access a user's electronic mail (e-mail) so as to send out spam e-mail (i.e., bulk, unsolicited e-mails).

To obtain a user's security credentials, an identity thief engages in a process referred to as scamming. Scamming normally entails an identity thief sending a user an e-mail, instant message (IM), or other communication in which the thief impersonates a trusted party, such as an administrator of the network or resource or a website. The communication contains some ruse (such as needing to reset the user's account after a problem has occurred) to trick the user into giving his or her security credentials to the thief. The user typically is tricked into divulging his or her security credentials to the thief through a communication such as an e-mail, an IM, or an authentic looking website with a login form that submits to the thief instead of to the owner of the network or resource.

Scamming not only inconveniences and harms the direct victims, but also may cause an owner of a network or resource to incur significant costs. The owner may need to spend time and money restoring scammed user accounts (e.g., reset the password and delete thief-created subaccounts). The owner also may incur operational costs resulting from the fraudulent usage of accounts, such as to send spam. Some owners, such as, for example, ISPs, also may incur higher user retention/acquisition costs due to user dissatisfaction with spam and with being scammed.

Scamming is not only confined to obtaining security credentials. Scammers may also try to get other sensitive data, such as bank account numbers, credit card numbers, or personal data. For instance, a scammer may send a communication, such as an e-mail, to a user of an online auction site. In the communication, the scammer pretends to be the auction site and indicates to the user that the auction site needs the user to verify his or her billing information. The communication may contain a link to a fake website that is designed to look like the website of the online auction. The fake website requests the user to submit his or her billing information, including credit card number. When the user submits the information, it is sent to the scammer, rather than the online auction.

SUMMARY

In one general aspect, protection is provided against a computer user unintentionally giving away sensitive data to an illegitimate or unintended entity. The protection includes detecting an entry or partial entry of the sensitive data into a client application capable of communicating the sensitive data across a network to other computer users. In response to an entry or partial entry of the sensitive data into the client application, an action is performed that is suitable to reduce the likelihood of an unintentional giveaway of the sensitive data to an illegitimate or unintended entity or to reduce the effect of an unintentional giveaway of the sensitive data to an illegitimate or unintended entity.

Implementations may include one or more of the following features. For example, the entry or partial entry of a variation of the sensitive data into the client application may be detected. In response to an entry or partial entry of the variation into the client application, an action may be performed that is suitable to reduce the likelihood of an unintentional giveaway of the variation to an illegitimate or unintended entity or to reduce the effect of an unintentional giveaway of the variation to an illegitimate or unintended entity.

Performing the action may be limited such that the action is performed only when the client application is being used in an unsafe context. Determining whether the context is unsafe may include determining whether a sequence of events preceding the entry or partial entry is known to be either unsafe or safe. Determining whether the context is unsafe may include determining whether the intended recipient of the sensitive data is known to be either unsafe or safe. Determining whether the context is unsafe also may include comparing the provider of a communication mechanism provided to the client application for communicating the sensitive data to a list of providers known to be safe. A list of providers known to be safe may include a list of ISP client form ids, a list of globally trusted web domains, or a list of personally trusted web domains.

The sensitive data and/or the variation may be text-based and a matcher program or object that accepts input text and a string-matching pattern may be used to detect the entry or partial entry of the sensitive data or a variation. The matcher program or object compares the input text to the string-matching pattern to determine if the input text matches the sensitive data or a variation. The string-matching pattern may be generated by applying a stored pattern-generating function to the sensitive data.

A matcher program or object that accepts input text and the sensitive data may be used to detect the entry or partial entry of the sensitive data or a variation. The matcher program or object compares the input text to the sensitive data, a portion of the sensitive data, or a variation of the sensitive data encoded in the matcher program or object to determine if the input text matches the sensitive data or a variation.

The action performed may include preventing the user from communicating the sensitive data using the client application; warning the user that communicating the sensitive data might be unsafe; or logging the user's communication of the sensitive data.

The sensitive data may include, for example, security credentials, such as those used to log onto an ISP's network or onto a website. The sensitive data also may include, for example, a credit card number, PINs, personal data, or bank account number.

The details of one or more implementations are set forth in the accompanying drawings and the description below. Other features will be apparent from the description and drawings, and from the claims.

DESCRIPTION OF DRAWINGS

FIGS. 2B and 2C are flow charts illustrating an exemplary implementation for detecting a user entry of text-based sensitive data using input text pattern-matching.

FIGS. 4A-4C illustrate the operation of an implementation for protecting against the giveaway of security credentials through an instant message or e-mail.

Like reference symbols in the various drawings indicate like elements.

DETAILED DESCRIPTION

Generally, protection is provided to prevent a computer user from unintentionally giving away sensitive data (e.g., security credentials, credit card number, PINs, personal data, or bank account number) to an illegitimate or unintended entity by means of a client application capable of communicating the sensitive data across a network to other computer users. To provide the protection, user input is monitored to detect a user entry of the sensitive data into the client application for communication to other users. When such an entry occurs, action is taken to reduce the likelihood of an unintentional giveaway of the sensitive data or to reduce the effects of an unintentional giveaway.

Figure 1:
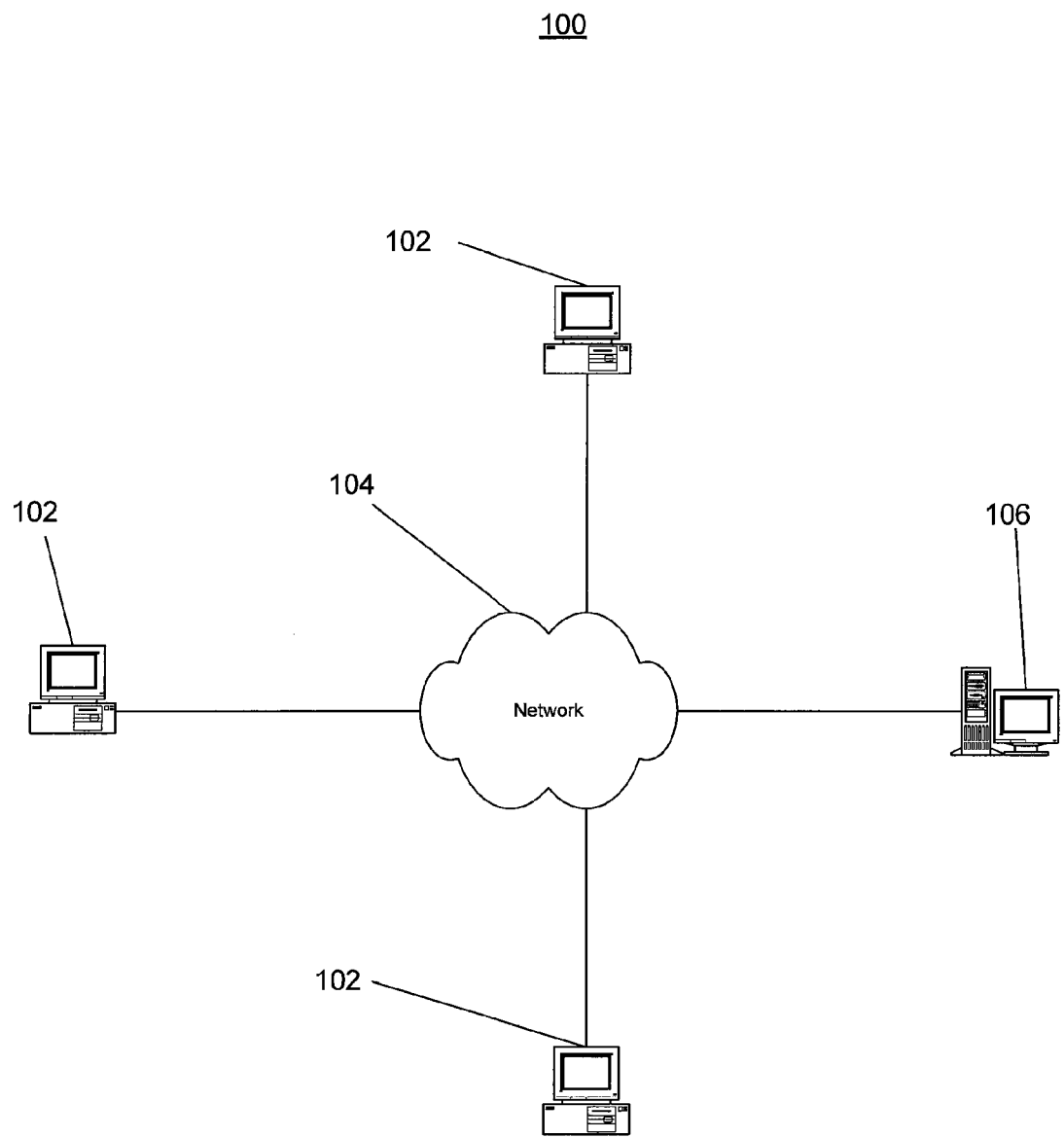
FIG. 1 is a block diagram illustrating an exemplary networked computing environment that supports communications between computer users.

FIG. 1 illustrates an exemplary networked computing environment 100 that supports communications between computer users and in which the presently described techniques for protecting sensitive data may be implemented. A network 104 interconnects client systems 102 and other systems, such as a server system 106. Users can use client systems 102 to communicate with one another and to access resources available through network 104, such as content or services available on client systems 102 or server system 106. Client systems 102 may be connected to network 104 through various communication mediums, such as a modem connected to a telephone line (using, for example, serial line internet protocol (SLIP) or point-to-point protocol (PPP)) or a direct internetwork connection (using, for example, transmission control protocol/internet protocol (TCP/IP)).

Each of the client systems 102 may be implemented using, for example, a general-purpose computer capable of responding to and executing instructions in a defined manner, a personal computer, a special-purpose computer, a workstation, a server, a device, a component, other equipment, or some combination thereof capable of responding to and executing instructions. Client systems 102 may receive instructions from, for example, a software application, a program, a piece of code, a device, a computer, a computer system, or a combination thereof, which independently or collectively direct operations, as described herein. Some instructions may take the form of one or more client applications capable of communicating with other computer users, accessing various computer resources, and viewing, creating, or otherwise manipulating electronic content available through network 104. For instance, such client applications may include electronic mail (e-mail) programs, instant messaging (IM) programs, web browsers, file transfer protocol (FTP) programs, voice-over-IP (VoIP) programs, the AOL® client, or the CompuServe® client. The instructions may be embodied permanently or temporarily in any type of machine, component, equipment, storage medium, or propagated signal that is capable of being delivered to the client systems 102.

The network 104 typically includes a series of portals interconnected through a coherent system. Examples of the network 104 include the Internet, Wide Area Networks (WANs), Local Area Networks (LANs), analog or digital wired and wireless telephone networks (e.g., a Public Switched Telephone Network (PSTN)), an Integrated Services Digital Network (ISDN), or a Digital Subscriber Line (xDSL)), or any other wired or wireless network.

The network 104 may include multiple, interconnected networks or subnetworks. A client system 102 may connect to a first subnetwork, through which the client system 102 is connected to the other subnetworks forming network 104. For example, an ISP may have a network that is connected to the backbone of the Internet, which consists of numerous interconnected networks. A user may use a client system 102 to attempt a connection to the edge of the ISP's network (the ISP's point-of-presence or POP). For instance, at the ISP's POP, the attempted connection from client system 102 may be received and the user may be authenticated before client system 102 is connected to the ISP's network.

Through the ISP's connection to the Internet, the authenticated user can use client system 102 to communicate with other client systems 102 or server system 106 connected (possibly also through an ISP) to the Internet. The communications may include, for example, e-mail, audio data, video data, general binary data, or text data (e.g., encoded in American Standard Code for Information Interchange (ASCII) format). The authenticated user can use client system 102 to access resources on other systems (e.g., server system 106) connected to the Internet.

There also may be content, services, or other resources on the ISP's network that an authenticated user may access. Similarly, the authenticated user also may be able to communicate with other users on the ISP's network.

Server system 106 may provide content, services, or other resources that are available to other systems, such as client systems 102, connected to network 104. Server system 106 also may facilitate some direct or indirect communications between client systems 102. As with the client systems 102, server system 106 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. Server system 106 may receive instructions from, for example, a software application, a program, a piece of code, a device, a computer, a computer system, or a combination thereof, which independently or collectively direct operations, as described herein. Some instructions may take the form of one or more server applications. Such server applications may include, for example, e-mail servers, IM servers, FTP servers, VoIP servers, or web servers. The instructions may be embodied permanently or temporarily in any type of machine, component, equipment, storage medium, or propagated signal that is capable of being delivered to the server system 106.

In such an environment, a user of a client system 102 may be tricked into unintentionally giving away his or her sensitive data (e.g., transmitting the sensitive data to a counterfeit entity that may exploit such data). An identity thief, for instance, may trick a user of a client system 102 into unintentionally giving the thief the user's security credentials for accessing network 104. The thief may do so by sending a ruse communication to the user's client system 102 in which the identity thief may masquerade as a trusted party, inform the user that his or her security credentials are needed to correct a problem or for some other valid reason, and provide instructions indicating how the credentials can be communicated to the "trusted party" using a client application. Believing that the trusted party needs his or her security credentials for a valid reason, the user may follow the instructions to send a communication containing the security credentials using a client application on client system 102. For example, the user may include his or her credentials in an e-mail or IM, or the user may access a web page and submit the credentials using a form on the web page. Instead of being sent to a trusted party with a valid reason for needing the credentials, however, the communication with the credentials is sent to the identity thief.

Figure 2A:
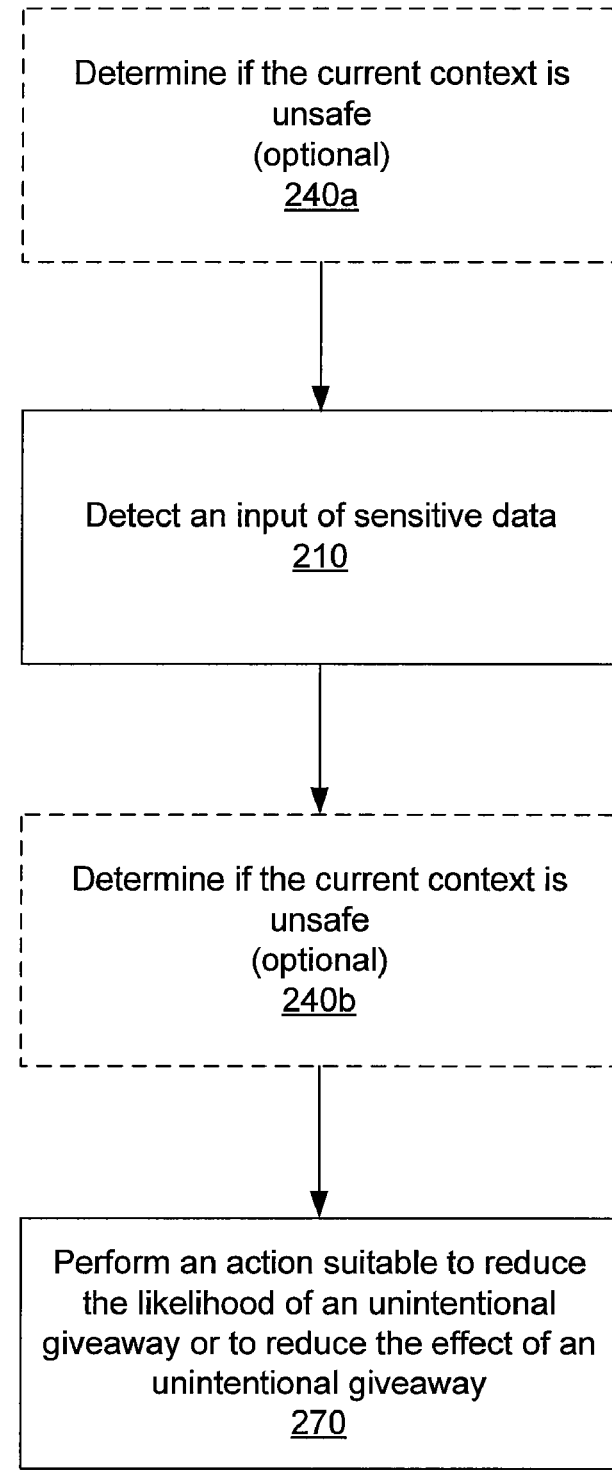
FIG. 2A is a flow chart illustrating a general method for protecting against an accidental or unintended communication of sensitive data to an illegitimate or unintended recipient.

FIG. 2A shows a flow chart illustrating a general method for protecting against an accidental or unintended communication of sensitive data, such as security credentials, to an illegitimate or unintended recipient. A client application capable of communicating the sensitive data to other computer users monitors user input to detect when a user enters the sensitive data into the client application for communication to another user (210). The client application may monitor for an entry of the entire sensitive data (i.e., a full entry) or it may monitor for entry of only a portion of the sensitive data (i.e., a partial entry). An entry or partial entry of variations of the sensitive data also may be detected as a means of preventing scammers from circumventing the protection by instructing users to enter variations of the sensitive data. Depending on the particular application, detecting the entry or partial entry of a variation may be performed as an alternative, rather than in addition, to detecting an entry or partial entry of the sensitive data.

When a user enters the sensitive data in the client application, a suitable action is performed to reduce the likelihood of an unintentional giveaway of the sensitive data or to reduce the effect of an unintentional giveaway of the sensitive data (270). For instance, the action may include preventing the user from communicating the data, warning the user that it might be unsafe to communicate the data, or silently logging the user's communication of the data.

Optionally, the context in which the client application is being used may be determined (240*a* or 240*b*). Determining the context in which the client application is being used may help to prevent "false alarms." False alarms occur when action is taken in response to a user entering sensitive data for transmission to a legitimate person or organization. For instance, a user may re-use the same security credentials for logging onto an ISP's network and for logging onto a secured website, such as a bank website that provides access to the user's bank account information. In this case, the user would enter his or her security credentials into a form on the bank's website to gain access to his or her account information. This is a legitimate communication of the security credentials and, even if the client application generally protects against a giveaway of the user's ISP security credentials, preferably, no action is taken to prevent the user's communication of the credentials in this context. By limiting when an action is performed to those times in which the context is unsafe, false alarms may be reduced or prevented.

The context in which an application is being used may include such items as the intended recipient of the communication, the provider of a communication mechanism, or the sequence of events surrounding or leading up to the intended communication (e.g., viewing an e-mail message and clicking on a hyperlink contained in the e-mail).

One manner of including context-checking involves evaluating the context in which the application is being used (240*a*) prior to monitoring the user input to detect an entry of sensitive data (210). That is, the client application first determines whether the context in which it is being used is unsafe (i.e., whether the client application is being used under conditions likely to involve an unintentional giveaway of credentials to an illegitimate or unintended entity) and then the client application monitors user input to detect an entry of sensitive data (240). The monitoring may be limited to only being performed when the application is being used in an unsafe context. That is, monitoring to detect a user entry of sensitive data (210) may be performed only when there is user entry in an unsafe context. Alternatively, the monitoring may continuously be performed after the context is checked, but the action (270) is only taken if the context was determined to be unsafe.

Another manner of including context-checking involves evaluating the context in which the application is being used (240*b*) after detecting a user entry of sensitive data. In this case, after a user entry of sensitive data or a variation is detected (210), a determination is made as to whether the data was entered in an unsafe context (240*b*). Action then is taken (270) when the context is determined to be unsafe.

The protected data may be any kind of sensitive data. For example, the data can be any type of security credentials, such as passwords, PINs, or secret questions/answers (e.g., Mother's maiden name). The security credentials may provide access to any type of resource, such as a user's client system; a network; content, services, or other resources available through a network; a bank account; or a credit card account. The sensitive data may be, for example, personal data, such as name, address, phone number, or social security number. Also, for instance, the sensitive data may be financial information, such as a bank account number or a credit card number.

The client application may be any application that provides the capability of communicating the sensitive data to other computer users. For instance, the client application could be a stand-alone web browser (such as Netscape Navigator or Microsoft Internet Explorer) that allows the communication of sensitive data through a website, a stand-alone IM program (such as AOL® Instant Messenger™) that allows sensitive data to be communicated by an instant message, or a stand-alone e-mail program (such as Netscape Messenger or Microsoft Outlook) that allows the communication of sensitive data by an e-mail message. The client application may be an integrated application that provides for logging on to an ISP's network and that supports numerous communications services using the ISP's network. For instance, the AOL® client allows users to log onto the AOL® network and supports numerous communications services such as e-mail, IM, and web browsing. In the case of an integrated client, the client application may monitor user input to detect when a user enters sensitive data for communication using any of the numerous communication services supported by the client application (e.g., e-mail, IM, and web browsing). The client application also may be the computer operating system (OS) if the OS provides support for communicating the sensitive data to other computer users.

Any method of detecting the input of all or a portion of the sensitive data, or a variation thereof, may be used, and the specific method used may depend on the exact nature of the sensitive data and/or how it is stored in the client application. For instance, many security credentials, such as passwords and screennames, are textual in nature. In an implementation in which the sensitive-data is text based and stored as text by the client application, input text pattern-matching is a suitable method of detecting the input of the data or variations of the data.

In an implementation in which the sensitive-data is text-based, but stored as a hash value, a suitable method of detecting an input of the data may include hashing the input data to obtain a hash value, and comparing the obtained hash value to the stored hash value to determine whether the input data was the sensitive data. In such a situation, a manner of detecting variations may include using functions that remove particular variation patterns from the input data to obtain intermediate data, hashing the intermediate data to obtain a hash value, and comparing the obtained hash value to the stored hash value to determine whether the input data was the sensitive data. For example, if the variation of the sensitive-data that is to be checked for is the sensitive-data with an extra character (e.g., a space) inserted between each letter of the sensitive data, then an extractor function for this variation would take the input data and strip out every other character. The resulting intermediate data would then be hashed to obtain a hash value and the hash value would be compared to the stored hash value of the sensitive-data to determine whether the input data was a variation of the sensitive-data.

Figure 2C:
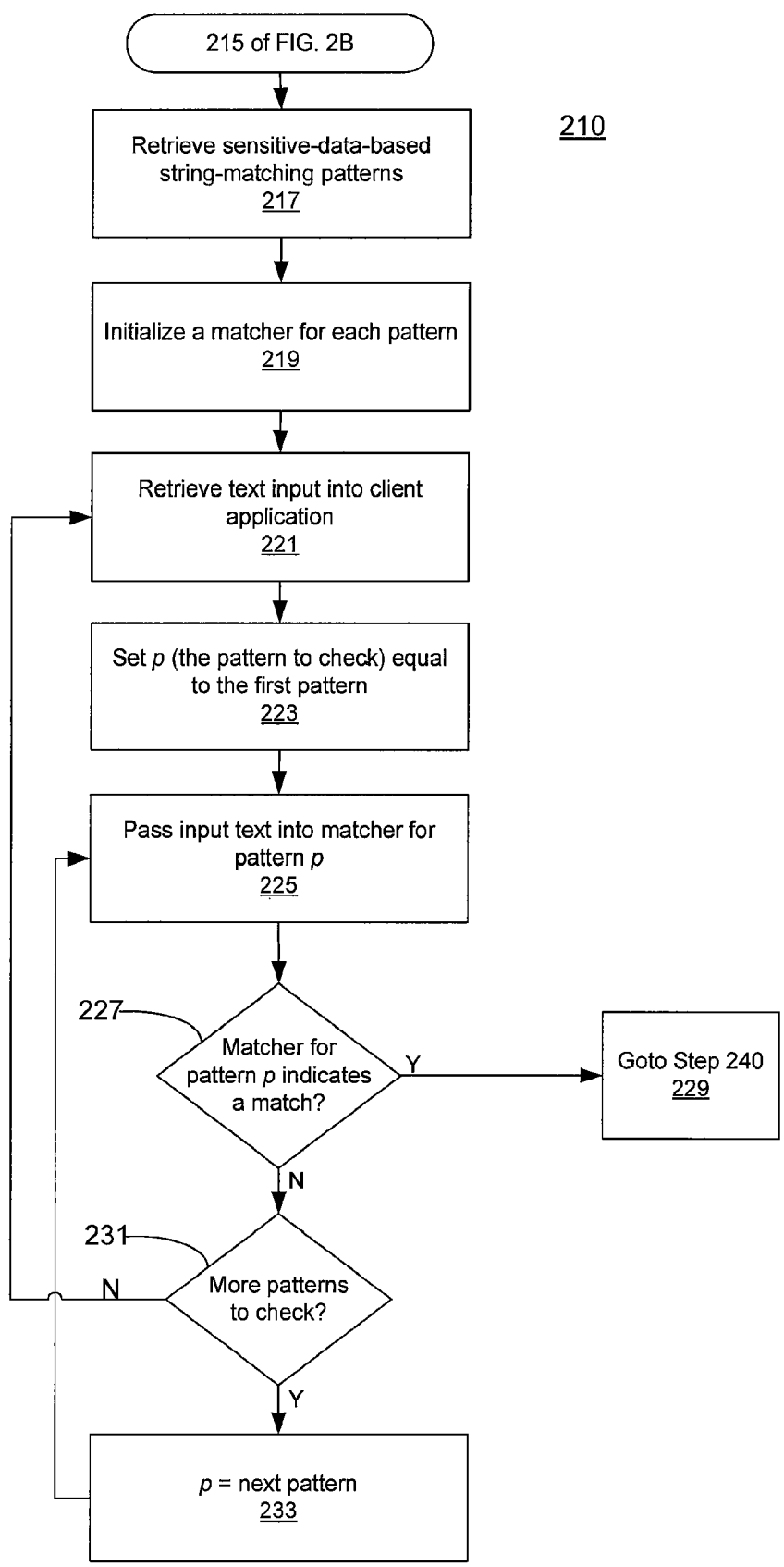

FIGS. 2B and 2C show flow charts illustrating an exemplary implementation of input checking 210 that uses input text pattern-matching to detect the entry of text-based sensitive data or variations of the data. Input text pattern-matching typically entails the use of string pattern-matching to detect when an input text string matches a predefined text pattern. String pattern-matching normally involves defining a text pattern in a pre-existing or newly-created text pattern language. For example, the text pattern language may be regular expressions or a more powerful context-free language. A matcher program or object then is designed to determine whether input text matches the text pattern. Generally, string pattern-matching and the associated pattern languages, techniques and algorithms (e.g., regular expressions, Knuth-Pratt-Morris algorithm, and Boyer-Moore algorithm.) are well-known to those of skill in the art.

FIG. 2B illustrates aspects of the exemplary process 210 that involve generating string-matching patterns based on the sensitive data for use by a matcher program or object to determine if input text matches sensitive data or a variation. A set of one or more pattern-generating functions is stored by the client application (211). A pattern-generating function typically is a small program that takes the sensitive data as input and produces as output a string-matching pattern based on the sensitive data. The pattern-generating functions may be written in a scripting language such as Javascript, Perl, or Tcl in order to facilitate the rapid updating of clients already in the field. An exemplary pattern-generating function written in Javascript is:

```
function PGF1(cred) {
    var patt = '\\' + cred[0];
    for (I=1; I<cred.length; I++) {
        patt += '.\\' + cred[I];
    }
    return patt;
}
```

This function, for example, would generate the regular expression pattern "\m.\y.\p.\a.\s.\s.\w.\o.\r.\d" from the security credential "mypassword". If the pattern language is regular expressions, then the resulting pattern will match strings containing the characters in the sensitive data separated by any single character (the metacharacter "." in regular expressions matches any single character, while the metacharacter "\" in regular expressions escapes any special meaning for a character). For example, if the sensitive data was "mypassword", the pattern would match strings such as "mAyBpCaDsEsFwGoHrId", "mWyWpWaWsWsWwWoWrWd", "m.y.p.a.s.s.w.o.r.d", or "m y p a s s w or d").

The following is another example of a pattern-generating function written in Javascript:

```
function PGF0(cred) {
    var patt = '\\' + cred[0];
    for (I=1; I<cred.length; I++) {
        patt += '\\' + cred[I];
    }
    return patt;
}
```

This function, for example, would generate the pattern "\m\y\p\a\s\s\w\o\r\d" from the security credential "mypassword". Such a pattern in regular expressions would match the security credential exactly.

Each pattern-generating function in the stored set is applied to the sensitive data to generate a list of sensitive-data-based string-matching patterns (213). This list then is stored by the client application (215), and used to detect input text that matches the pattern (as described below).

The stored set of pattern-generating functions may be updateable through downloads of an updated set of pattern-generating functions. The downloads may be from an organization that updates the set in response to new circumvention techniques employed by identity thieves. The organization may be, for example, an ISP, such as AOL®. An initial set of pattern-generating functions may be sent to the client application, with following updates sent incrementally.

The sensitive data to which the pattern-generating functions are applied can be obtained in a number of different ways depending upon the specific security credentials to be protected and the particular client application. For instance, if the client application is a stand-alone web browser, the user may be required to manually input the sensitive data into the client application for storage and protection against giveaway. Or, for example, if the client application is a stand-alone e-mail program, security credentials may have been previously entered by the user and stored for accessing an e-mail server. The stored credentials may be used to provide protection against their giveaway.

If the client application is an integrated application for connecting to an ISP's network and communicating using that network, and the sensitive data to be protected includes security credentials used to log on to the network and access the network services, then the credentials may be obtained and stored, for instance, when the credentials are manually provided by the user at logon (if they have not been previously stored for use in logging on). For example, the AOL® client is used to log on to and access the communication services provided by the AOL® network. The AOL® client may either store the security credentials required to log on to the network and use the services, or may require a user to enter them when logging on. In either event, when the user is logging on, the AOL® client has access to the security credentials and may store them for use in protecting against the user unintentionally giving them away through the communication services supported by the AOL® client.

FIG. 2C illustrates aspects of the exemplary process 210 that involves using the stored sensitive-data-based string-matching patterns to determine if the user has entered sensitive data or a variation of the sensitive data. The stored string-matching patterns are retrieved (217) and each pattern is passed to a respective instance of a matcher program or object of the client application. Each instance of the matcher program or object is initialized to use the respective pattern it receives (219). When text is input into the client application and retrieved (221), the current pattern against which the input text is to be checked, p, is set equal to the first pattern (223). The input text is passed to the instance of the matcher program or object that is initialized to use the pattern p (225). The matcher program or object applies a matching algorithm to determine if the input text matches the pattern p (227). If so, then step 240 of FIG. 2A is performed (229). If not, a determination is made as to whether the input text needs to be checked against other patterns (231). If so, then pattern p is advanced to the next pattern (233), and the input text is passed to the instance of the matcher program or object that is initialized to use pattern p (225). If not, then the process waits until more text is input into the client application (221).

As an alternative or in addition to special-purpose text pattern-matching matcher programs that are passed input text and a string-matching pattern, an arbitrarily complex, custom matcher program written in a general-purpose programming language (or other appropriate language) may be used to match arbitrary variations of the sensitive data, i.e. those not representable as an expression in a pattern language. A custom matcher program is passed the sensitive data and input text and performs the matching of the input text against specific variations encoded in the logic of the matcher program (e.g., matching the characters of sensitive data written in reverse order). The custom matcher program may be written in an interpreted scripting language like Javascript so that it can be downloaded to and executed by the client application "on the fly."

The following is an example of a custom matcher program in Javascript, and a description of how it might be utilized by the application software. This matcher program matches a user typing a variation of his or her password in which:

(1) each lowercase letter in the password is replaced with the next letter in the alphabet (e.g., "a" would become "b"), except "z", which is replaced with "!"; and (2) all uppercase letters and non-alphabet characters in the password are unchanged.

The above variation may be what a scammer would instruct the user to type into the communication, rather than the straight password. The scammer may request a variation so as to both circumvent the protection techniques and to bolster the scammer's credibility. For instance, the scammer may tell the user that it is unsafe to send a straight password across a network, so the above variation is needed to provide security for the communication of the password. Such a fabrication may tend to make the scammer's ruse more believable.

```
// Declare global storage to be used by matching program
var deriv = '';
var len;
var currentSubstring = '';
//
// Initialize the matching program by providing it with the user's password.
// Input:
//    - password = user's password
//
function initializeMatcher(password) {
    // generate derivation of password
    for (i=0; i<password.length; i++) {
        var c = password.charAt(i);
        if ((c >= 'a') && (c < 'z')) {
            deriv += String.fromCharCode(password.charCodeAt(i) + 1);
        } else if(c == 'z') {
            deriv += '!';
        } else {
            deriv += c;
        }
    }
    len = password.length;
}
//
// Send the matching program the next character typed by the user, to
//check for a match.
// Input:
//    - c = character just typed by user
//
function nextChar(c) {
    currentSubstring += c;
    if (currentSubstring == deriv) {
        // match!
        foundMatch( ); // call application function to handle a match
    } else {
        // keep the last n−1 chars. typed for password of length n
        currentSubstring = currentSubstring.slice(−(len−1)); }
}
```

Examples of passwords and the derivations that would be matched include:

foOBar→gpOBbs ny0911→oz0911

Custom matcher programs and pattern-language-dependent matcher programs (i.e., ones that are passed input text and string-matching patterns) may be used in conjunction with one another. For example, the pattern-language-dependent matcher program may be "built in" to the client application. Patterns or pattern-generating functions then may be transmitted to the client application for use with the built-in matcher program, while the custom matcher programs may be designed with arbitrarily complex matching logic and downloaded to the client system to be executed by the client application. In this case, an option would exist to simply design string-matching patterns for variations that are expressable in a pre-existing pattern language, while arbitrarily complex matching logic can be designed for variants that are not so easily expressed.

Entered text may be retrieved and passed to the matcher program in a number of ways depending on the particular application of the described techniques. For example, the client application may send each character as it is typed to the matcher program (this is the assumed approach illustrated in the sample custom matcher program above—the nextChar( ) function assumes each character is sent as it is typed). This approach is useful in cases where the data could possibly be incrementally communicated without the user expressly instructing it to do so. For instance, in a web page, a scammer could use Javascript to send each character as it's typed. Alternatively, the client application may buffer up the input and send the buffered input to the matcher program just before the user's input would be communicated. This second approach would be more efficient in situations where the client application doesn't communicate any data until the user instructs it to do so, e.g. by pressing a send button on email or IM.

While various parts of the processes illustrated in FIGS. 2B and 2C are described as being performed on the client system, any of the steps may be performed on the client system, on a server system, or on a combination of both. For example, the client application may send input text to a server system, which would then perform the matching functions and send an indication back to the client application as to whether the input text matched the sensitive data. The client application, for instance, may send the sensitive data to a server system, which then would create the sensitive-data-based string-matching patterns using the pattern-generating functions and send the patterns back to the client. Similarly, while the various processes have been described as being performed by the client application, other programs, such as plug-ins for the client application, other stand-alone applications, server software, or a computer operating system, may instead perform some or all of the above described processes for input text pattern-matching.

As described above, the context in which the application is being used may be checked to determine if it is an unsafe one (240a or 240b). There are a variety of contexts that may be considered unsafe depending on various factors, such as the specific data to be protected, the particular client application, and the nature of the identity thieves' and other scammers' ruses. In some situations, all contexts may be considered unsafe.

A number of methods may be used for determining if the context is unsafe. For instance, in some situations, a communication mechanism may be provided to the user's client application for communicating the sensitive data. In such a situation, context may be determined by examining the provider of the communication mechanism. The provider may be examined using a list of providers known to be safe or, conversely, using a list of providers known to be unsafe. By way of example, a web page with an input form may be provided to the user's client application (e.g., a web browser) for communicating the sensitive data. In such a situation, the domain providing the web page with the input form may be compared to a list of domains known to be safe or, conversely, known to be unsafe.

Similarly, for example, the intended recipient of a communication containing the sensitive data may be examined. The intended recipient may be examined using a list of recipients known to be safe or, conversely, using a list of recipient's known to be unsafe. For instance, a list of personally trusted IM or e-mail recipients may be used in a manner similar to the list of personally trusted web domains described below.

Also, for example, a sequence of events preceding the entry of the sensitive data may be examined. The sequence of events preceding the entry of the sensitive data may be examined using a list of sequences known to be unsafe. Conversely, a list of sequences known to be safe may be used.

In general, context checking may be performed at the client system or on a server system. Various methods of context checking may be used singly in a given application, or may be used in combination.

Figure 2D:
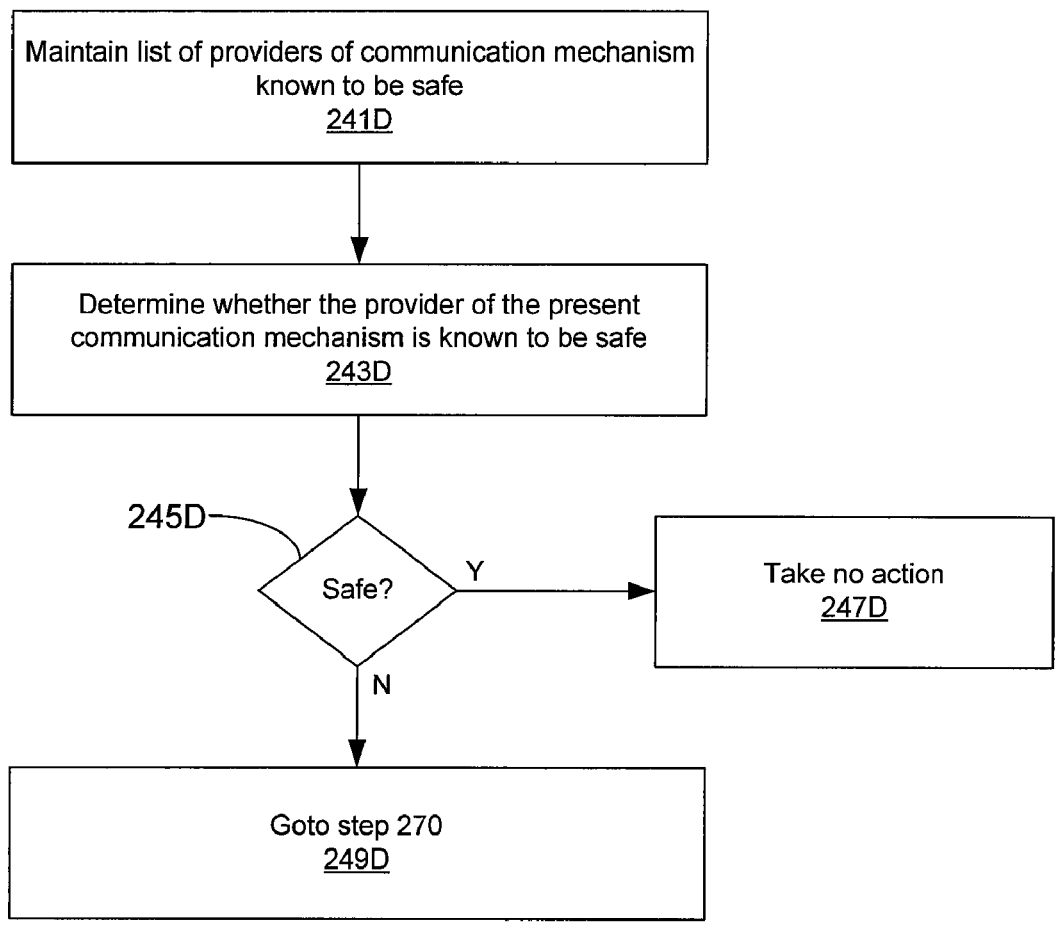
FIG. 2D is a flow chart illustrating an exemplary implementation of context checking in which the provider of the present communication mechanism for communicating the sensitive data is compared to a list of providers known to be safe.

FIG. 2D shows a flow chart illustrating an exemplary implementation of context checking 240 in which the provider of the present communication mechanism for communicating the sensitive data is compared to a list of providers known to be safe. A list of safe providers of communication mechanisms is maintained (241D). When a communication mechanism is provided to the user's client application for communicating the sensitive data and sensitive data is entered into the client application, the list is used to determine if the provider of the mechanism is a safe one (243D). If the provider is not (245D), then the context is considered unsafe, and step 270 of FIG. 2A is performed (249D). If the provider is safe (245D), then the context is considered safe, and no action is taken (247D).

Figure 2E:
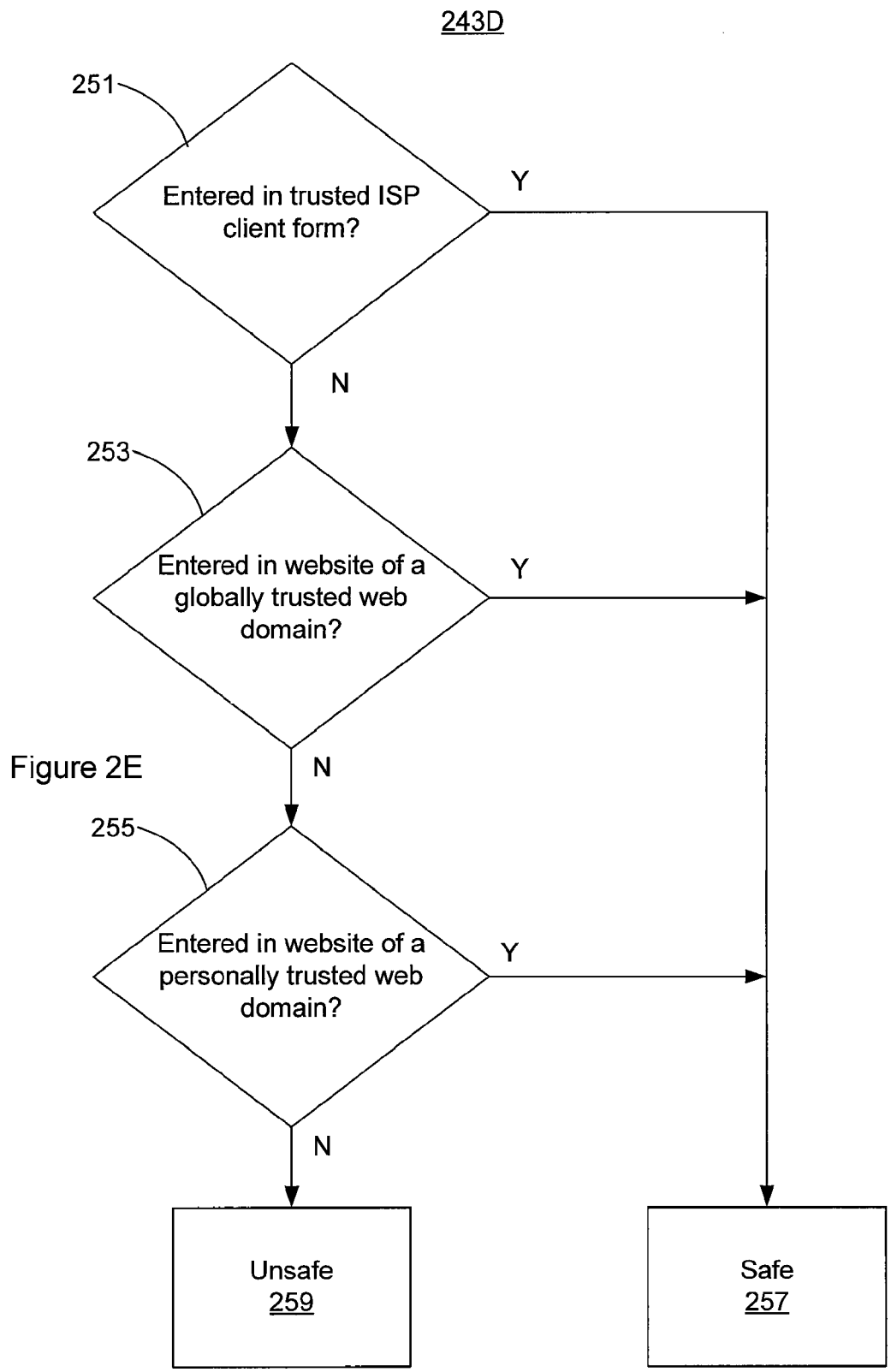
FIG. 2E shows a flow chart illustrating an implementation of the provider comparison shown in FIG. 2D for a case in which input forms are provided for communicating the sensitive data.

FIG. 2E shows a flow chart illustrating an implementation of the determination 243D shown in FIG. 2D for a case in which input forms are provided for communicating the sensitive data. The safe providers in this illustrated implementation are represented using three lists (but a different number of lists may be used in other implementations). A first list contains trusted ISP client form identifiers (ids). A second list contains globally trusted external web domains. A third list contains personally trusted external web domains.

When sensitive data is entered into a form, the client uses the list of trusted ISP client form ids to check whether the form is a trusted one from the ISP (251). ISP client form ids are identifications of forms provided from the ISP. The trusted ISP client form ids may be ones corresponding to forms in which a user is expected to enter his or her sensitive data. Such forms may only be accessible to users logged onto the ISP's network and may include, for instance, forms provided by the ISP for changing the user's logon security credentials. For some ISPs, the client form ids may be a proprietary type of identification used specifically with the ISPs client application, while for other ISPs the identification may be a non-proprietary type of identification, such as the domain from which the form is provided.

This list of trusted ISP client form ids may be maintained by the ISP and downloaded to the client application. An initial list of trusted ISP client form ids may be sent to the client application, with following updates sent incrementally. The client application then may use the list to determine whether the current form into which the data has been entered is a trusted ISP client form. Alternatively, the list of trusted ISP client form ids may be remotely hosted by a server system. In this case, the client application may communicate with the server system such that the server system can determine and inform the client application as to whether the form is from a trusted ISP client form. In any case, if the form is a trusted ISP client form, then the context is considered safe (257) and step 247D is performed.

If the form is not a trusted ISP client form, then the client application determines whether the form is from a website on a globally trusted external web domain (253). Globally trusted external domains are external (i.e., non-ISP specific) web domains that are accessible on the Internet and are known to the ISP to have trusted web pages with input forms. Examples of globally trusted domains may include login.yahoo.com (but not geocities.yahoo.com, which contains user-generated home pages that could be used for scamming) and cgi3.ebay.com (eBay's login domain). The list of globally trusted domains may be maintained by the ISP at a proxy server that retrieves web pages from the Internet for the web browser in the client application. If a requested web page is from a website in a web domain on the list, then the proxy server sends back an indication to the client application that the web page is a known, trusted page. When sensitive data is entered in the web page, the client application checks for this indication to determine whether the credentials are being communicated to a known, trusted web site.

Alternatively, the list of globally trusted web domains may be downloaded to the client application from the ISP. The client application then uses the list to determine if the form into which the security credentials have been entered is part of a website from a globally trusted domain. An initial list of globally trusted domains may be sent to the client application, with following updates sent incrementally.

If the form is from a globally trusted web domain, then the context is considered safe (257) and step 247D is performed. If the form is not from a globally trusted web domain, then the client application determines whether the form is from a personally trusted external web domain (255). Personally trusted web domains are internal (i.e., ISP specific domains) or external (i.e., non-ISP specific) web domains that are known to the user to have trusted web pages with input forms. This list may be maintained at the client application or on a server system. If the list is maintained on a server system, then the list may be downloaded and used by the client application to determine if the form is from a personally trusted web domain. Alternatively, if the list is maintained on a server system, then the client application may communicate with the server system such that the server system can determine and inform the client application whether the form is on the list of personally trusted web domains.

A user interface component may be used to provide a user with a comprehensive view of the list of personally trusted web domains. This interface component may provide the user with the ability to populate or modify the list by manually adding or deleting web domains. Other manners of populating the list may alternatively, or additionally, be provided. For example, a "don't warn me again about this site" option may be provided on a dialog presented to warn the user about submitting credentials to a website. In that case, the website's domain is automatically added to the list if the user selects the "don't warn me again" option.

If the form is from a personally trusted web domain, then the context is considered safe (257) and step 247D is performed. If the form is not from a personally trusted web domain, then the context is considered unsafe (259) and step 249D is performed.

Figure 2F:
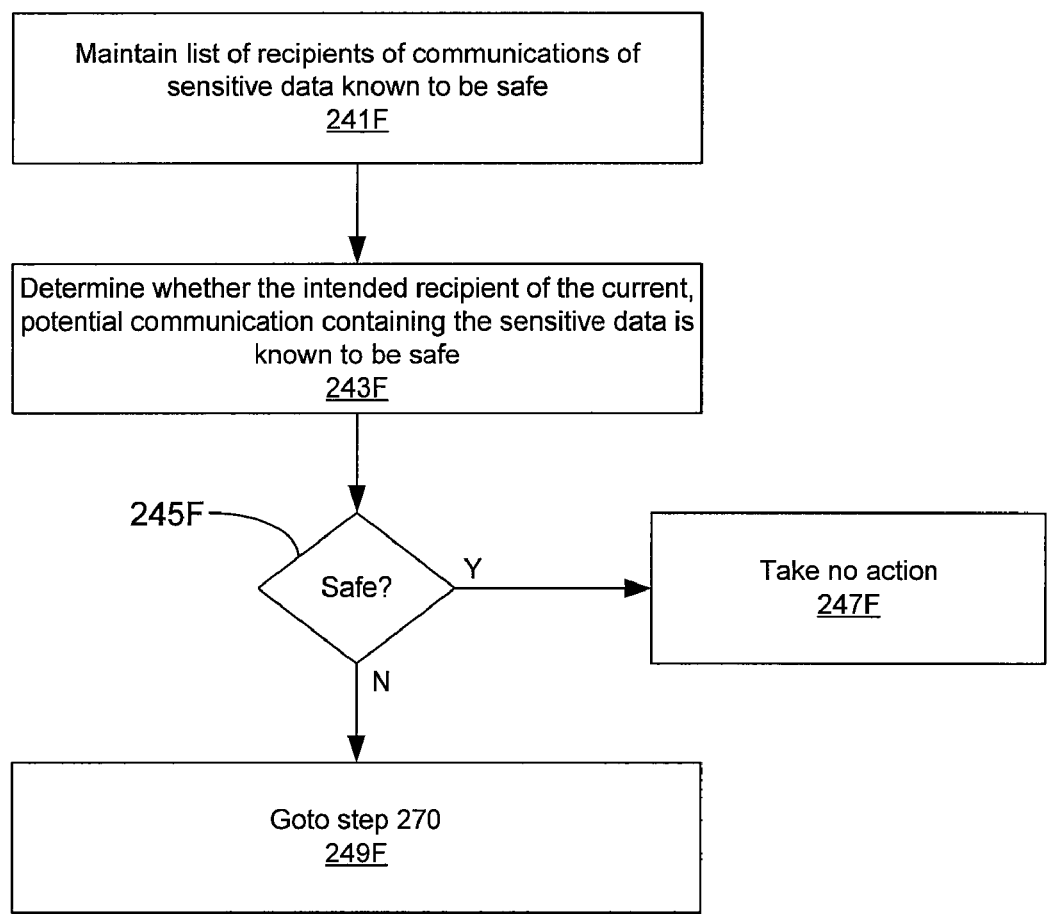
FIG. 2F is a flow chart illustrating an alternative (or additional) implementation of context checking in which the intended recipient of the current, potential communication of credentials is compared to a list of recipients known to be safe.

FIG. 2F shows a flow chart illustrating an alternative (or additional) implementation of context checking 240 in which the intended recipient of the current, potential communication of data is compared to a list of recipients known to be safe. A list of the safe recipients is maintained (241F). When sensitive data is entered into the client application for communication, the list is used to determine if the intended recipient of the communication (e.g., e-mail address or IM account) is a safe recipient (243F). If the intended recipient is not (245F), then the context is considered unsafe, and step 270 of FIG. 2A is performed (249F). If the intended recipient is safe (245F), then the context is considered safe, and no action is taken (247F).

Figure 2G:
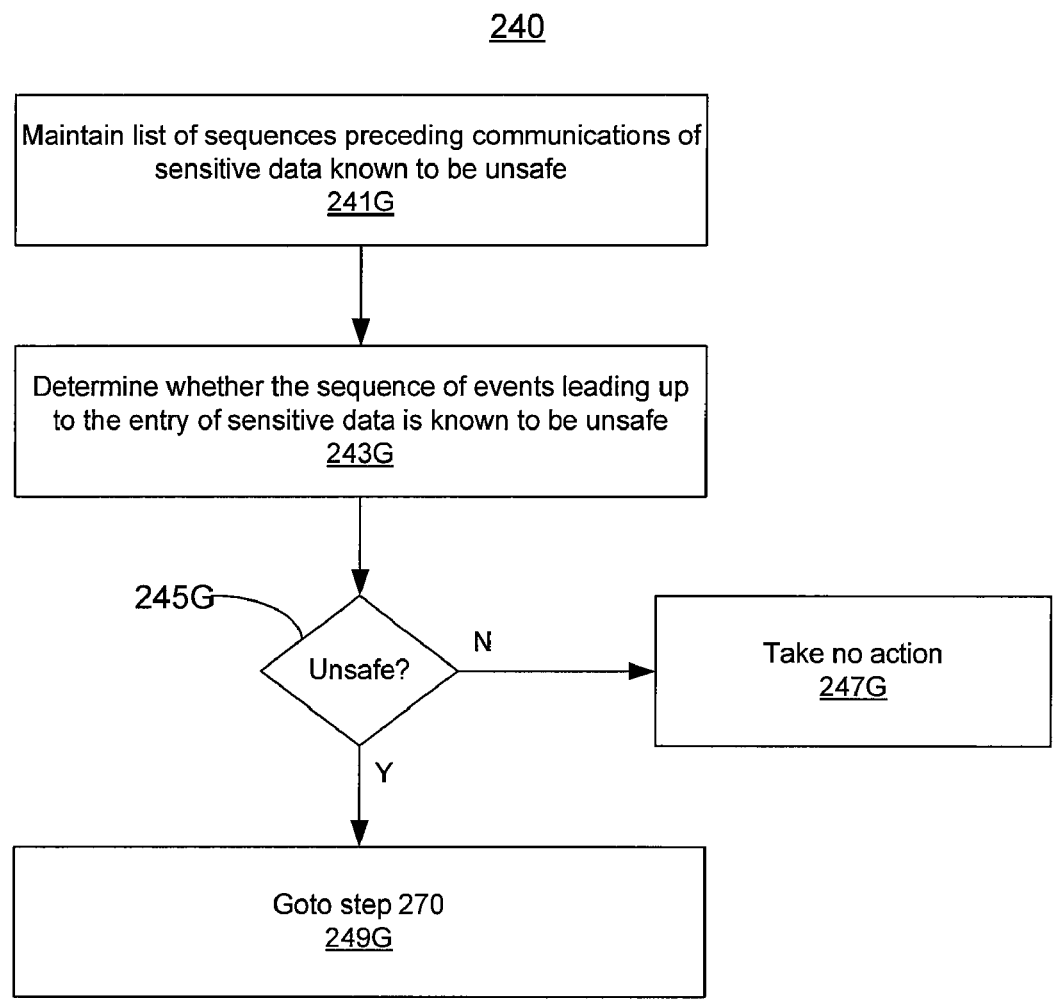
FIG. 2G is a flow chart illustrating an alternative (or additional) implementation of context checking in which a sequence of events preceding the entry of data is compared with a list of sequences that are known to generally be unsafe.

FIG. 2G shows a flow chart illustrating an alternative (or additional) implementation of context checking 240 in which a sequence of events preceding the entry of the data is compared with a list of sequences that are known generally to be unsafe. For many unintentional giveaways of sensitive data, there is a known sequence of events that precedes a user's entry of the data for communication. For instance, many scams perpetrated by identity thieves include sending an e-mail in which an identity thief pretends to be a trusted person who needs the user's security credentials. The e-mail has a hyperlink to a website that has a form for the user to enter his or her security credentials. This form communicates the credentials to the identity thief instead of to the trusted person whom the identity thief is pretending to be. Thus, in scams of this type, a known sequence of user actions/events precedes the entry of the credentials. The user reads an e-mail and then selects a hyperlink in the e-mail, which loads the web page in which the user enters his or her credentials. By comparing the sequence of events preceding a current entry of security credentials to a list of sequences known to be unsafe, a determination can be made as to whether the context of the current entry is unsafe.

To perform such a comparison, a list of sequences known to be unsafe may be maintained (241G). When sensitive data is entered into the client application, the list is used to determine if the sequence of events leading up to the entry is unsafe (243G). If the sequence preceding the entry is unsafe (245G), the context is considered unsafe and step 270 of FIG. 2A is performed (249G). If the sequence is not unsafe (245G), then the context is considered safe and no action is taken (247G).

Even with context checking, false alarms may occur frequently for users whose sensitive data is a common text string (e.g., "the"). To help prevent this, a dialog box (not shown) may be presented to inform the user that he or she should change the sensitive data to stop being subjected to so many false alarms. In addition, the user may be given the ability to turn off all checking for unintentional giveaways of sensitive data.

As described above, when sensitive data is entered in general, or in an unsafe context, a suitable action is performed to reduce the likelihood of an unintentional giveaway or to reduce the effect of an unintentional giveaway (270). The action may include, for example, preventing the user from communicating the data, warning the user that it might be unsafe to communicate the data, or silently logging the user's communication of the data. The exact action implemented may depend on the environment in which the present techniques are used or the needed level of security, and the action may be the result of a balance between security and intrusiveness to the user. For example, to avoid user impact, an application may be configured to only log the user's communication of sensitive data, without preventing any user actions. The recipient can then be investigated to determine if the recipient is an identity thief or other scammer and, if so, appropriate action can be pursued without ever disturbing the user. Or, if the added security warrants some intrusiveness to the user, a dialog can be presented to the user warning that it may be unsafe to continue and requesting the user to confirm the communication of the sensitive data. In another example, security for a corporate network may warrant completely preventing a user from ever communicating his or her security credentials.

Figure 3A:
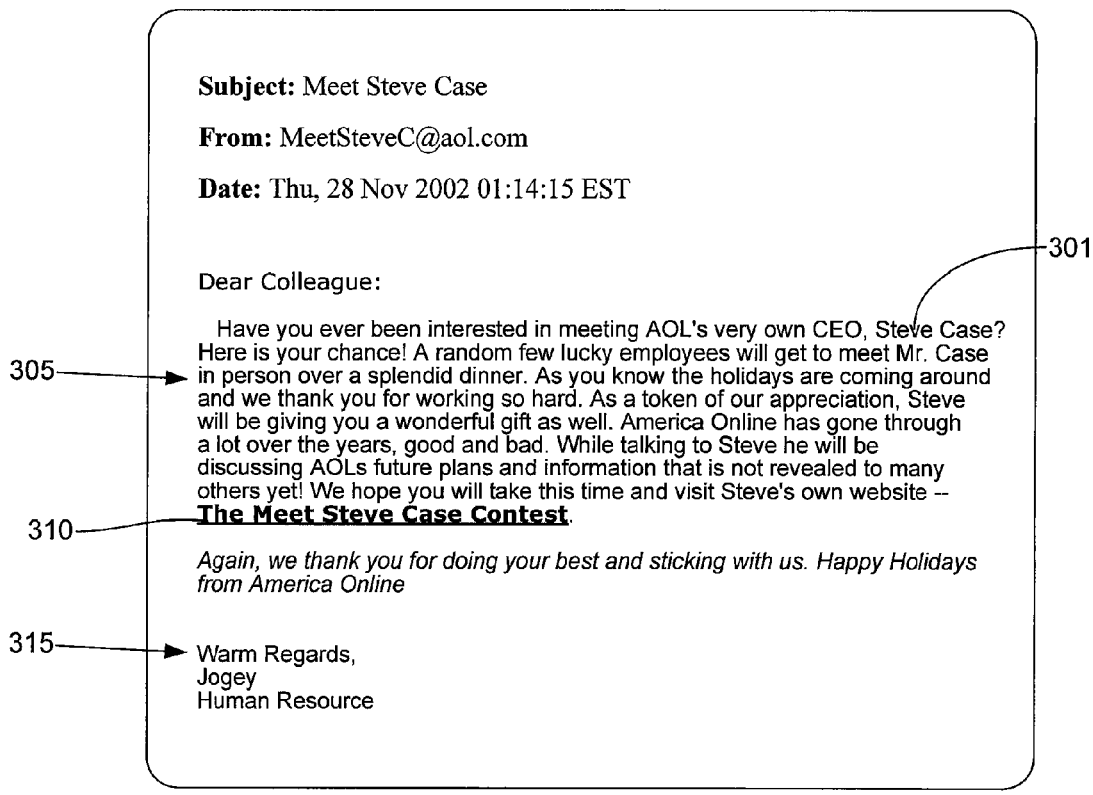
FIGS. 3A-3C illustrate the operation of an implementation for protecting against the giveaway of security credentials through a website form.
Figure 3B:
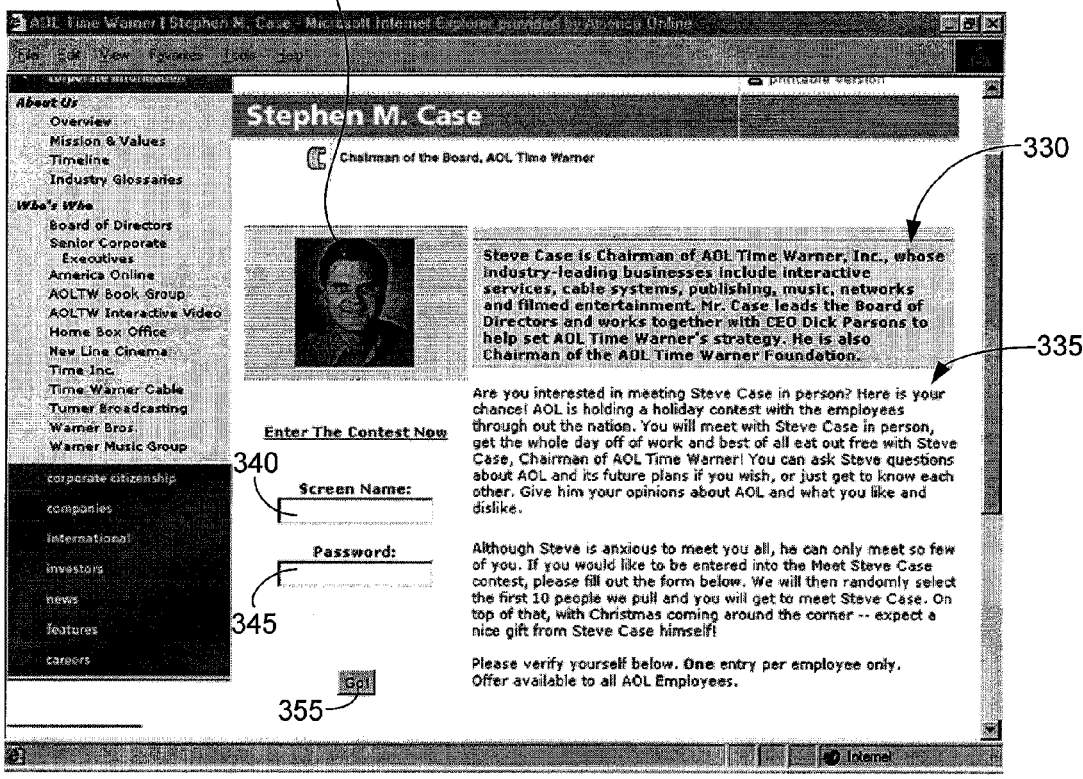
Figure 3C:
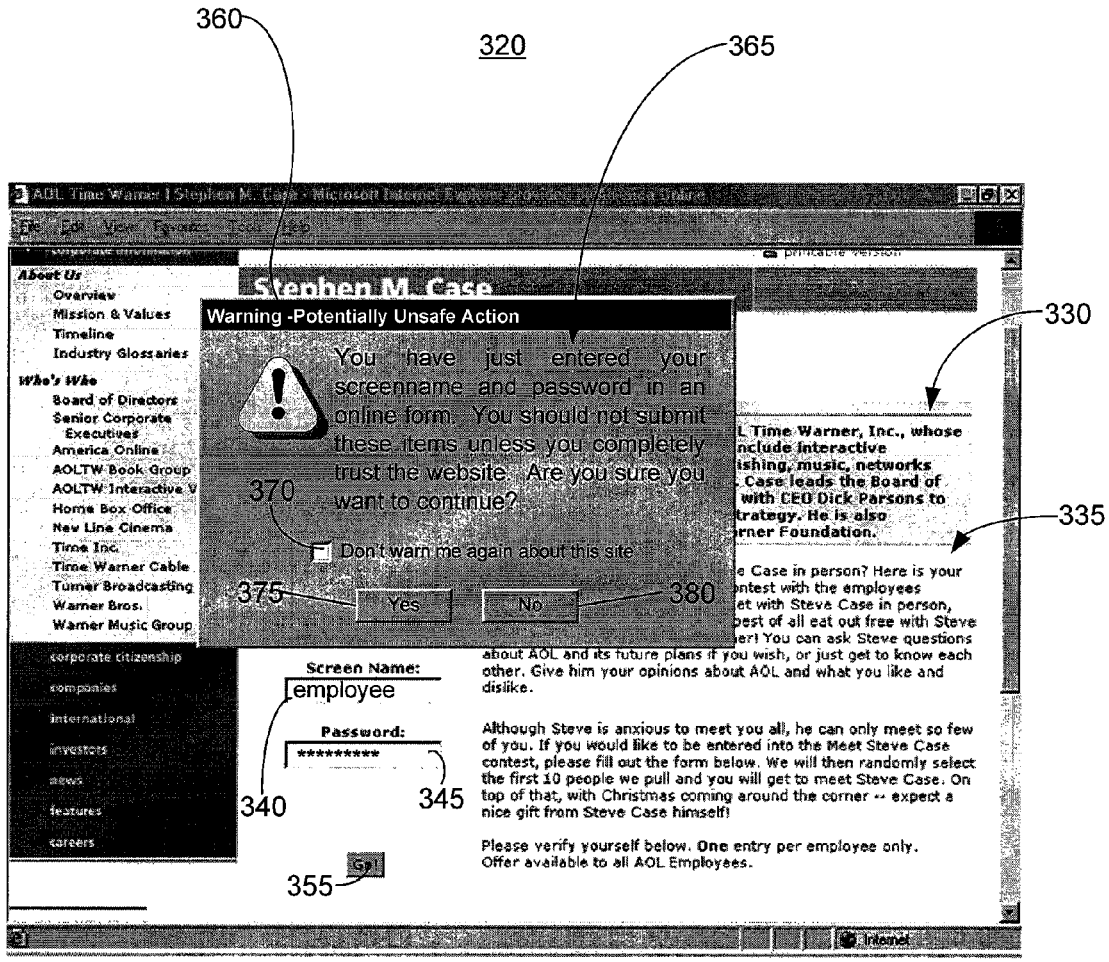

FIGS. 3A-3C illustrate the operation of an implementation for protecting against the giveaway of security credentials through a website form. Protection is provided against an identity thief seeking to obtain security credentials for accessing the network and associated resources provided by AOL®. The security credentials to access this network and resources include a screenname and password.

An AOL® employee uses a client system to connect to the AOL® network and resources. When the employee attempts to connect to the AOL® network using the client system, the employee presents his or her screenname and password for authentication. Once he or she is authenticated, the client system is connected to the AOL® network. The AOL® network is connected to the Internet such that the client system also can access the Internet once the client system is connected to the AOL® network.

FIG. 3A shows an exemplary communication 300, such as an e-mail or IM, received by the employee on the client system. The communication has been sent by an identity thief. The identity thief may have obtained the recipient's e-mail address, IM screenname, or other such account information for the communication in a number of ways. For example, if the communication is by e-mail, the identity thief may use an electronic directory to look-up e-mail addresses or the identity thief may try randomly generated screennames for the targeted e-mail domain. Furthermore, some systems issue new users a sequential number for the users' screenname. In such a situation, the identity thief may determine and use the newest sequential numbers so as to target new users with the scam, in an effort to bolster the thief's possibilities for success.

In order to obtain the user's trust, the identity thief has provided a signature 315 on the communication to indicate that he or she is a member of the human resources department at AOL®. The body of the communication 305 contains text 301 and a hyperlink 310. The text 301 informs the employee that he or she has a chance to meet with AOL's CEO by entering a contest in which a few employees will be chosen to have dinner with the CEO. The text 301 also tries to entice the employee into "entering" the contest by telling the employee that the CEO will give him or her a holiday gift. Hyperlink 310 is provided to link the employee to the "official" website for the contest. This contest, however, is a ruse set up by the identity thief to try and obtain the employee's security credentials.

Referring to FIG. 3B, the employee selects hyperlink 310, which invokes a web browser 320 on the client system to display the "official" website. This website has been set up by the identity thief to look like an authentic contest website. To that end, the website has a picture 325 of the CEO and some text 330 that provides profile information of the CEO. There also is text 335 that further describes the "contest." A "contest entry" form also is provided and contains a screenname textfield 340, a password textfield 345, and a submit button 355.

The point of the communication 300 and text 335 is to convince the employee that he or she can enter a contest to meet the CEO by entering his or her screenname and password into the respective textfields 340 and 345 and submitting them by selecting the submit button 355. However, if the employee inputs his or her screenname into the form and submits them using submit button 355, they are submitted to the identity thief, instead of AOL®.

Referring to FIG. 3C, as the employee enters characters into textfields 340 and 345, the employee's entries are compared to his or her screenname and password. Once the employee enters his or her screenname and password into textfields 340 and 345, then a match occurs and the context of this entry is compared to known safe contexts. Because, for example, the form is not from a known, trusted website, the context is considered unsafe. As a result, a warning dialog 360 is displayed to the employee to warn the employee that submitting his or her security credentials to this website may be unsafe.

Dialog 360 includes text 365 that warns the employee that his or her security credentials should not be submitted to a website unless the employee completely trusts the website. Text 365 also requests the employee to confirm whether or not he or she wants to continue. A "Yes" button 375 is provided for the employee to confirm that he or she wants to continue. Selecting Yes button 375 results in dialog 360 closing and the employee being allowed to submit the credentials by selecting submit button 355. A "No" button 380 is provided for the employee to indicate he or she does not want the credentials submitted. Selecting the No button 380 results in the employee being prevented from submitting the credentials. He or she may be prevented, for example, by clearing the entries in textfields 340 and 345 and disabling the submit button 355, or otherwise preventing communications with the website. As shown, the No button 380 is designated as the default entry.

Dialog 360 also has a check box 370 that can be used to indicate that the website's domain should be added to the employee's personal list of known, trusted web domains. Checking check box 370 and selecting the Yes button 375 adds the domain to the employee's personal trusted list. Once the domain is added, dialog 360 is not shown again when the employee returns to the website and enters his or her credentials.

In the situation shown, the employee would hopefully realize that the website is questionable and would choose not to continue with the submission of the credentials by selecting No button 380.

Figure 4B:
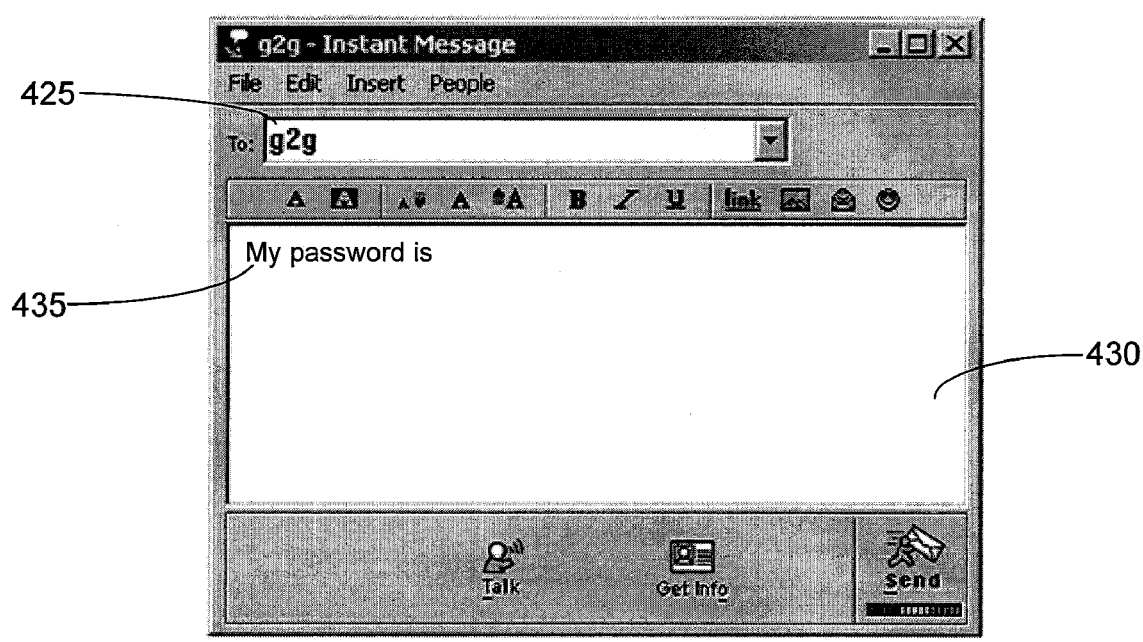
Figure 4C:
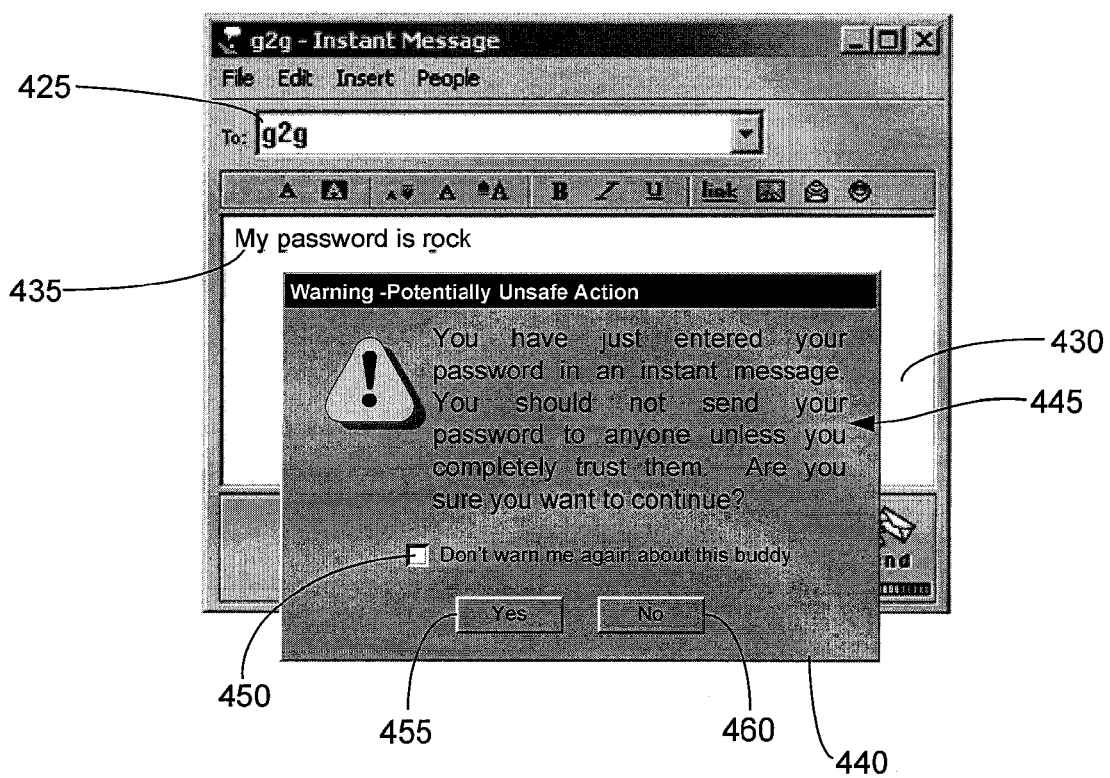

FIGS. 4A-4C illustrate the operation of an implementation for protecting against the giveaway of security credentials via an instant message or e-mail. Like the implementation described with respect to FIGS. 3A-3C, protection is provided against an identity thief seeking to obtain security credentials for accessing the network and associated resources provided by AOL®.

FIG. 4A shows an exemplary communication 400, such as an e-mail or IM, sent by an identity thief to an employee of AOL® and received by the employee on a client system connected to the AOL® network. In order to obtain the employee's trust, the identity thief has provided a signature 410 that indicates the communication is from a member of AOL® Operations Security. The body of the communication 405 contains text that informs the employee that some of the internal AOL® accounts are being updated. The text explains that the employee's screenname and password are needed in order to complete the updates. Instructions as to how this information is to be communicated is provided as part of the text. The instructions ask the employee to send an instant message containing the information to the instant message account "g2g." The updates, however, are a ruse set up by the identity thief to try and obtain the employee's security credentials.

While the following description depicts protection against a giveaway through an IM client application, an implementation protecting against a giveaway through an e-mail client application may operate in a similar manner (if, for example, the instructions had asked the employee to send the information to an e-mail address, such as g2g@foo.com).

Referring to FIG. 4B, the employee follows the instructions and opens an instant message composition window 420 (or, similarly, an e-mail composition window if the instructions had asked the user to send the credentials by e-mail). Window 420 includes a recipient textbox 425 for setting the recipient of the instant message, and an input textbox 430 for typing in the instant message. Once the instant message is typed, the employee can send it to the recipient by pressing the "enter" key on the keyboard.

As shown, the employee has set the recipient in textbox 425 to "g2g" and has begun to compose an instant message 435 in textbox 430. The instant message contains the text "My password is."

Referring to FIG. 4C, as the employee types the message, the input text is compared to the employee's password. Once the employee enters his or her password (which, as shown, is "rock"), a match occurs and the context of this entry is compared to known safe contexts. Because, for example, the recipient is not a known, trusted instant message account (or e-mail address), the context is considered unsafe. As a result, a warning dialog 440 is displayed to the employee to warn the employee that sending his or her security credentials to this account (or e-mail address) may be unsafe.

Dialog 440 includes text 445 that warns the employee that his or her security credentials should not be sent to anyone unless the employee completely trusts the person. Text 445 also requests the employee to confirm whether or not he or she wants to continue. A "Yes" button 455 is provided for the employee to confirm that he or she wants to continue. Selecting Yes button 455 results in dialog 440 closing and the employee being allowed to send the IM (or e-mail) with the credentials. A "No" button 460 is provided as a default for the employee to indicate he or she does not want to send the IM (or e-mail) with the credentials. Selecting the No button 460 results in the employee being prevented from sending the credentials. He or she could be prevented, for example, by clearing the message in input text box 430 and preventing IMs (or e-mails) from being sent to the designated recipient.

Dialog 440 also has a check box 450 that can be used to indicate that the recipient should be added to the employee's personal list of known, trusted IM (or e-mail) recipients. Checking check box 450 and selecting the Yes button 455 adds the recipient to the employee's personal trusted list. Once the recipient is added, dialog 440 is not shown again when the employee tries to send another IM (or e-mail) containing his or her credentials to the recipient.

In the situation shown, the employee would hopefully realize that the recipient is questionable and would choose not to continue with the IM (or e-mail) by selecting the No button 460.

The techniques described above are not limited to any particular hardware or software configuration. Rather, they may be implemented using hardware, software, or a combination of both. The methods and processes described may be implemented as computer programs that are executed on a device comprising at least one processor and at least one data storage system (e.g., programmable computer, cellular phone, or personal digital assistant). The data storage system may be any type of storage medium or device usable with a processor (e.g., CD-ROM, RAM, or magnetic disk). The programs may be implemented in a high-level programming language and may also be implemented in assembly or other lower level languages, if desired.

Any such program will typically be stored on a computer-usable storage medium or device (e.g., CD-ROM, RAM, or magnetic disk). When read into the processor of the computer and executed, the instructions of the program cause the programmable computer to carry out the various operations described.

Furthermore, while the techniques have been described primarily as being performed by the client application that is capable of communicating the credentials, other programs, such as plug-ins for the client application, other stand-alone applications, or the computer operating system, may instead perform some or all of the described techniques.

Other implementations are also within the scope of the following claims.

What is claimed is:

1. A computer-implemented method of protecting against an unintentional giveaway of sensitive data by a computer user to an illegitimate or unintended entity, the method comprising:
    monitoring data being entered by a computer user into a client application, wherein the client application includes a web page with an input form, and the monitoring comprises:
        determining whether a provider of a communication mechanism provided to the client application is an ISP;
        determining whether the provider is globally trusted, wherein globally trusted providers include web domains that are external to an ISP network that are known to the ISP to have trusted web pages with input forms; and
        determining whether the provider is personally trusted, wherein personally trusted providers include web domains that are known to a user of the client application to have trusted web pages with input forms;
    accessing a set of pattern generating functions;
    generating a set of string matching patterns by applying the set of pattern generating functions to sensitive data;
    determining that the data being entered into the client application matches one or more of the string matching patterns in the set of string matching patterns; and
    in response to determining that the data being entered into the client application matches one or more of the string matching patterns in the set of string matching patterns, performing one or more of the following actions: requesting that the computer user confirm a communication of the data; warning the computer user that communicating the data might result in an unintentional giveaway of sensitive data to an illegitimate or unintended entity; preventing the client application from communicating the data; or logging a communication of the data by the client application.

2. The computer-implemented method of claim 1 wherein monitoring data being entered into a client application includes using a list that comprises a first list of ISP client form ids, a second list of globally trusted web domains, and a third list of personally trusted web domains such that determining whether the provider is a trusted provider comprises:
    using the first list to determine whether the provider is the ISP;
    using the second list to determine whether the provider is the globally trusted web domain; and
    using the third list to determine whether the provider is the personally trusted web domain.

3. The computer-implemented method of claim 1 further comprising detecting that the web page is provided from a web domain that is not on a list of trusted web domains.

4. The computer-implemented method of claim 1 further comprising detecting that the web page is provided from a web domain that is on a list of suspect web domains.

5. The computer-implemented method of claim 1 further comprising:
passing the data entered into the client application to a matcher program or object; and
passing at least one of the string-matching patterns to the matcher program or object.

6. The computer-implemented method of claim 1 further comprising:
selecting at least one matcher program or object; and
detecting an entry or partial entry of a variation of the sensitive data by:
passing data entered into the client application to the selected matcher program or object;
passing the sensitive data to the matcher program or object; and
comparing the data entered to a variation of the sensitive data encoded in the matcher program or object.

7. The computer-implemented method of claim 1 further comprising determining whether a sequence of events preceding the entry of the data is known to be characteristic of an unintentional giveaway of sensitive data to an illegitimate or unintended entity.

8. The computer-implemented method of claim 1 further comprising determining whether a sequence of events preceding the entry of the data is known to be characteristic of a submission of sensitive data to a legitimate or intended entity.

9. The computer-implemented method of claim 1 further comprising determining whether an intended recipient of the data entered into the client application is known to be an illegitimate or unintended entity.

10. The computer-implemented method of claim 1 further comprising determining whether an intended recipient of the data entered into the client application is known to be a legitimate or intended entity.

11. The computer-implemented method of claim 1 further comprising determining whether a provider of a communication mechanism provided to the client application for communicating data is not a trusted provider.

12. The computer-implemented method of claim 1 wherein the action comprises preventing the client application from communicating the data.

13. The computer-implemented method of claim 1 wherein the action comprises warning the computer user that communicating the data might result in an unintentional giveaway of sensitive data to an illegitimate or unintended entity.

14. The computer-implemented method of claim 1 wherein the action comprises logging a communication of the data by the client application.

15. The computer-implemented method of claim 1 wherein the action comprises requesting that the computer user confirm a communication of the data.

16. The computer-implemented method of claim 1 wherein the data comprises security credentials.

17. The computer-implemented method of claim 16 wherein the security credentials comprise security credentials used to log onto an ISP's network.

18. The computer-implemented method of claim 16 wherein the security credentials comprise security credentials used to log onto a website.

19. The computer-implemented method of claim 1 wherein the data comprises a credit card number.

20. A non-transitory computer-usable medium storing a computer program for protecting against an unintentional giveaway of sensitive data by a computer user to an illegitimate or unintended entity, the computer program comprising instructions for causing a computer to:
monitor data being entered by a computer user into a client application, wherein the client application includes a web page with an input form, and the monitoring comprises:
determining whether a provider of a communication mechanism provided to the client application is an ISP;
determining whether the provider is globally trusted, wherein globally trusted providers include web domains that are external to an ISP network that are known to the ISP to have trusted web pages with input forms; and
determining whether the provider is personally trusted, wherein personally trusted providers include web domains that are known to a user of the client application to have trusted web pages with input forms;
access a set of pattern generating functions;
generate a set of string matching patterns by applying the set of pattern generating functions to sensitive data;
determine that the data being entered into the client application matches one or more of the string matching patterns in the set of string matching patterns;
in response to determining that the data being entered into the client application matches one or more of the string matching patterns in the set of string matching patterns, perform one or more of the following actions: requesting that the computer user confirm a communication of the data; warning the computer user that communicating the data might result in an unintentional giveaway of sensitive data to an illegitimate or unintended entity; preventing the client application from communicating the data; or logging a communication of the data by the client application.

21. A computer-implemented method of protecting against an unintentional giveaway of sensitive data by a computer user to an illegitimate or unintended entity, the method comprising:
monitoring, via a processor, data being entered by a computer user into a client application, wherein the client application includes a web page with an input form, and the monitoring comprises:
determining whether a provider of a communication mechanism provided to the client application is an ISP;
determining whether the provider is globally trusted, wherein globally trusted providers include web domains that are external to an ISP network that are known to the ISP to have trusted web pages with input forms; and
determining whether the provider is personally trusted, wherein personally trusted providers include web domains that are known to a user of the client application to have trusted web pages with input forms;
accessing, via the processor, a set of pattern generating functions;
generating, via the processor, a set of string matching patterns by applying the set of pattern generating functions to sensitive data;
determining, via the processor, that the data being entered into the client application matches one or more of the string matching patterns in the set of string matching patterns;
in response to determining that the data being entered into the client application matches one or more of the string matching patterns in the set of string matching patterns, performing one or more of the following actions: requesting that the computer user confirm a communication of the data; warning the computer user that communicating the data might result in an unintentional giveaway of sensitive data to an illegitimate or unintended entity; preventing the client application from communicating the data; or logging a communication of the data by the client application.

* * * * *